(No Model.) 4 Sheets—Sheet 1.

H. M. WILSON & H. CLEMENTSON.
MACHINE FOR MOLDING SPOOLS.

No. 565,061. Patented Aug. 4, 1896.

Attest:
L. Lee.
Edw. F. Kinsey.

Inventors.
Henry Clementson,
Henry M. Wilson, per
Thomas S. Crane, Atty

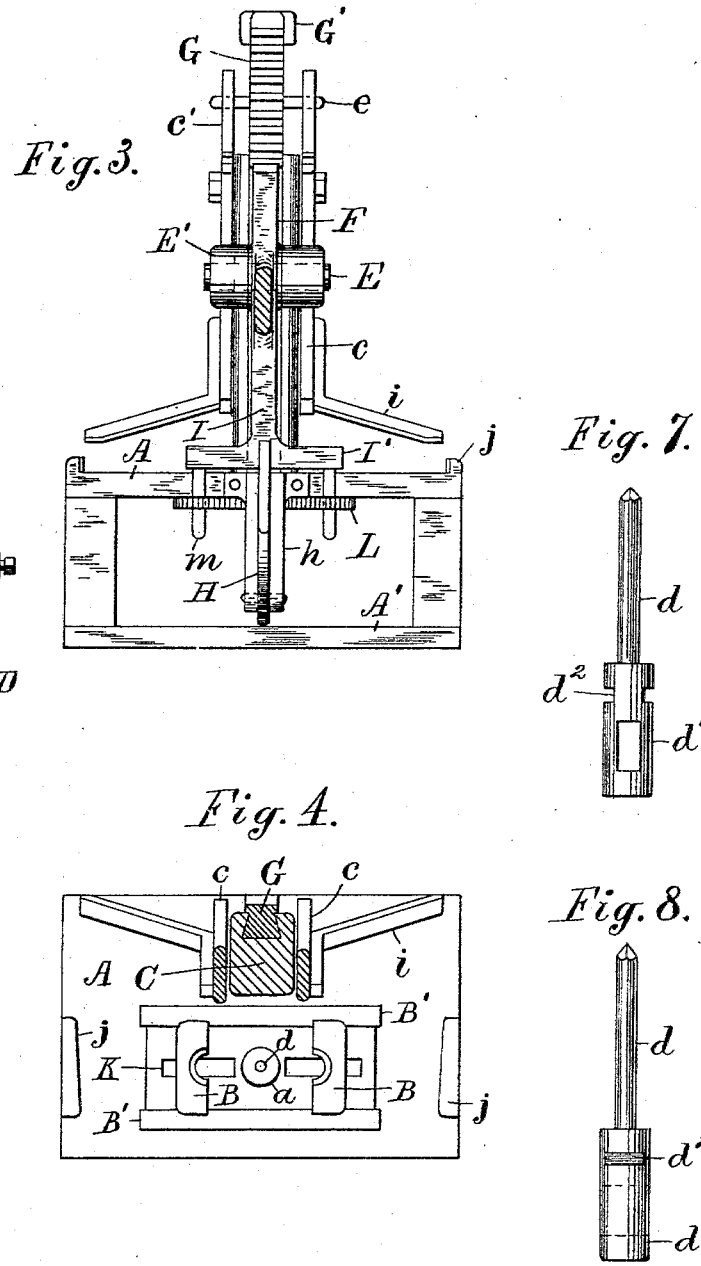

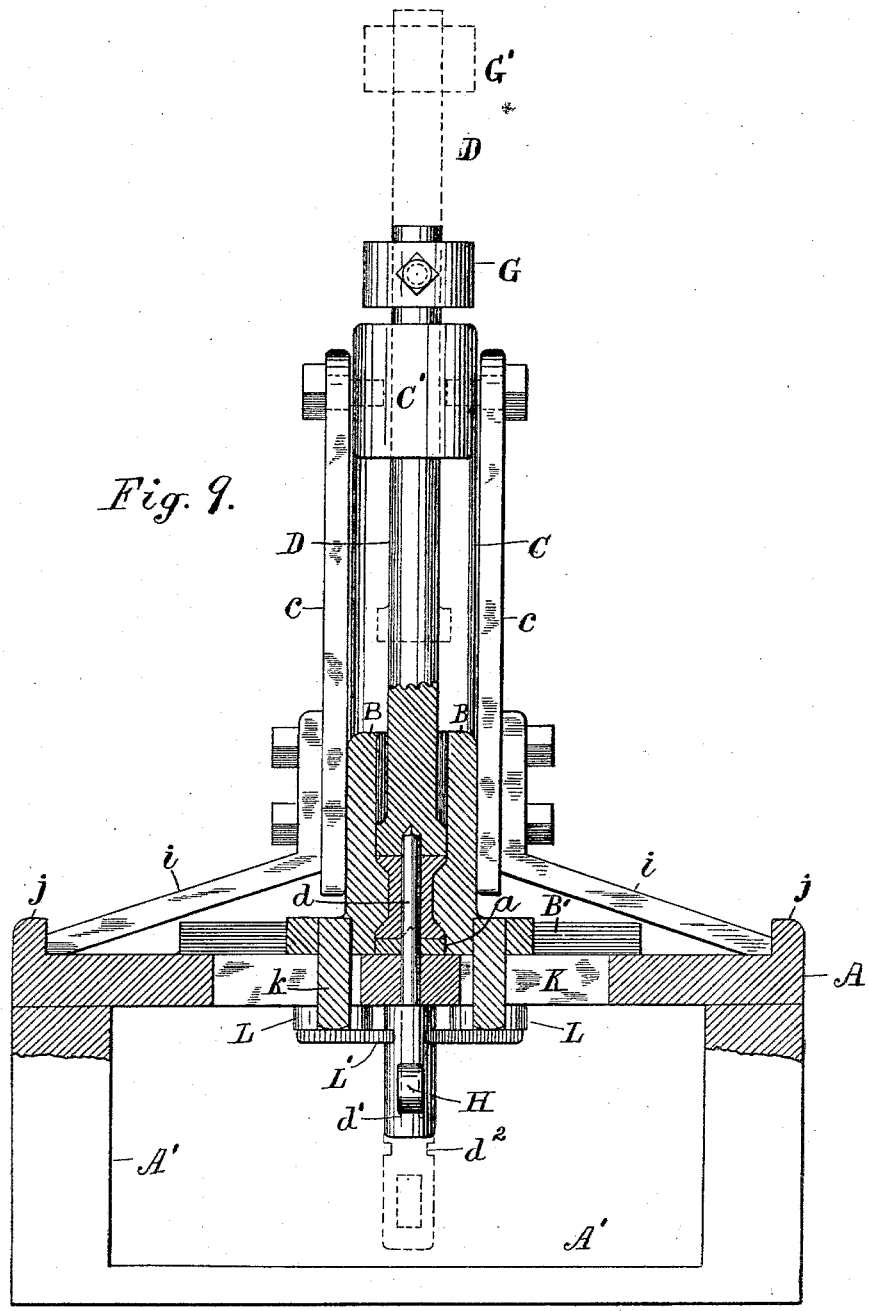

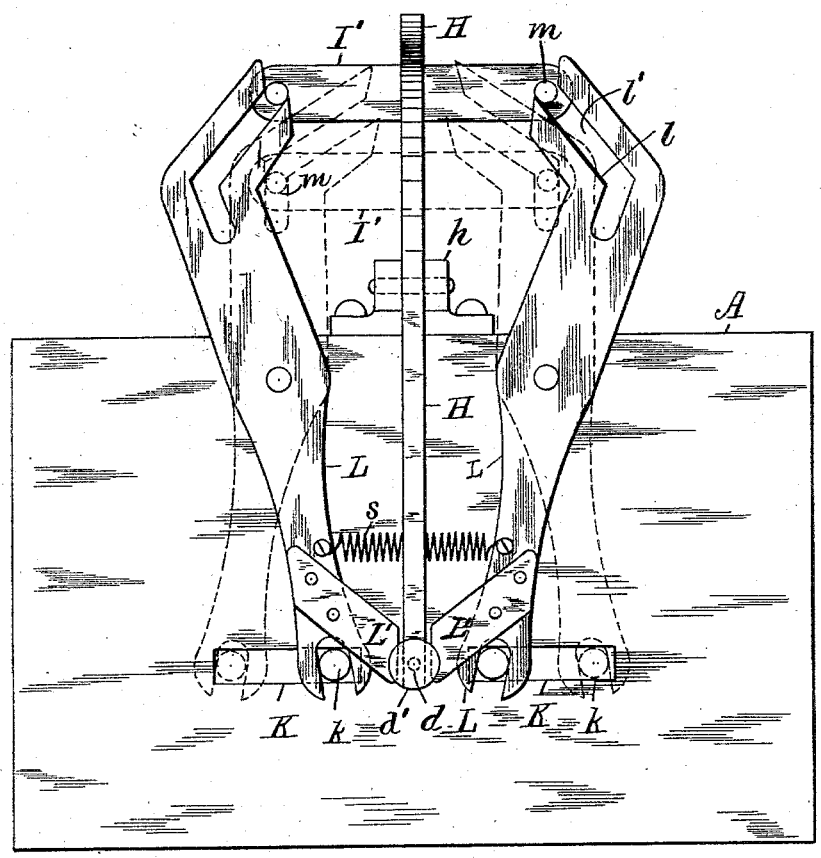

UNITED STATES PATENT OFFICE.

HENRY M. WILSON, OF SOMERSET, MASSACHUSETTS, AND HENRY CLEMENTSON, OF BROOKLYN, NEW YORK.

MACHINE FOR MOLDING SPOOLS.

SPECIFICATION forming part of Letters Patent No. 565,061, dated August 4, 1896.

Application filed March 16, 1896. Serial No. 583,323. (No model.)

*To all whom it may concern:*

Be it known that we, HENRY M. WILSON, residing at Somerset, county of Bristol, State of Massachusetts, and HENRY CLEMENTSON, residing at Brooklyn, county of Kings, State of New York, citizens of the United States, have invented certain new and useful Improvements in Machines for Molding Spools, fully described and represented in the following specification and the accompanying drawings, forming a part of the same.

The object of this invention is to furnish an automatic apparatus for molding spools from plastic composition composed in part of wood fiber or analogous substance; and the invention consists, essentially, in a longitudinally-divided mold with a mandrel movable therein to form the bore of the spool, combined with mechanism for moving the semimolds and mandrel and the plunger which compresses the material.

In the present invention we preferably furnish a clamp to embrace the semimolds when arranged to form the spool, and thus relieve the mold-shifting mechanism of all strain during the pressing operation.

Our apparatus is especially adapted for use with compositions which are softened by heat, as those in which shellac is an ingredient, the blanks being warmed to soften them before their insertion in the mold, and allowed to cool after they have been pressed into the shape of the spool. Such compositions contain sawdust and analogous substances, and are already used in the manufacture of door-knobs and cabinet-ware trimmings, and the wood fiber or similar element, when used, is combined with any suitable ingredients to form the desired composition.

The special means for operating the clamping-jaws and for reciprocating the semimolds, the mandrel, and the plunger will be understood by reference to the annexed drawings, in which—

Figure 1:
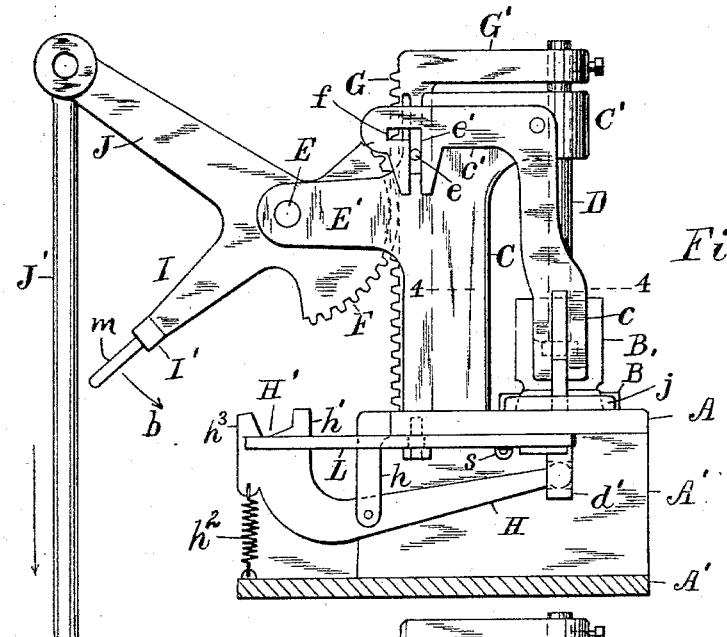
Figure 2:
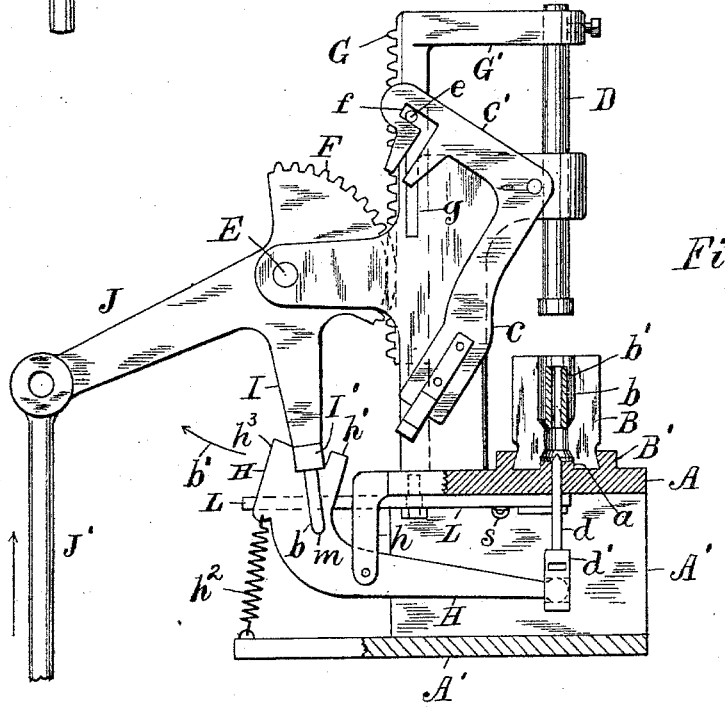

Figure 1 is a side elevation of the apparatus with the end of the frame cut away. Fig. 2 is a similar elevation with the end of the bed cut away and the nearer semimold and mold-lever removed. Fig. 3 is a rear elevation of the machine, and Fig. 4 a plan of the same in section on line 4 4 in Fig. 1. Fig. 5 is a side elevation of the rack-bar and plunger detached. Fig. 6 is a plan of the rack-bar detached. Fig. 7 is a front view of the mandrel detached, and Fig. 8 a side view of the same. Fig. 9 is a front elevation of the apparatus with the mold closed, in section where hatched at the center line of the mold. Fig. 10 shows the under side of the bed removed from its supporting-frame.

We will first describe the construction shown in the drawings, and then point out the essential features of the invention.

A designates a horizontal bed supported upon a box-frame A'. The semimolds B rest vertically upon the bed with feet fitted to parallel guides B'. A standard C is projected upward from the bed in the rear of the mold with bearing C' at the top to receive the vertically-movable plunger D. A centering-plug $a$ is fixed upon the bed midway between the guides, centrally below the plunger, and the mold is counterbored at the bottom to accurately fit the sides of such plug and the mold when centered exactly beneath the plunger. The lower part of the mold, as shown in Figs. 2 and 9, is suitably shaped to form the spool, and the upper part is formed with a chamber $b$, adapted to receive a tubular blank $b'$ of compressible material.

A mandrel $d$ is fitted to the center of the plug $a$ and is provided with a slotted head $d'$, by which it is moved upwardly within the mold when closed, the blank being dropped upon the tapering point of the mandrel before compression, as shown in Fig. 2.

A rock-shaft E is pivoted in bearings E' upon the rear of the standard, and provided with a segment F. A rack-bar G is fitted to a vertical groove in the standard and meshes with the teeth of the segment F, and a head G' is extended from the rack-bar to embrace the top of the plunger D. A mandrel-lever H is pivoted to a bearing $h$, with its forward end extended beneath the bed into the slot of the mandrel-head $d'$, and the rear end of the mandrel-lever is provided with an upwardly-projecting toe $h'$ to engage an arm I upon the rock-shaft E and with a spring $h^2$ to press the mandrel normally upward. A treadle-lever J is shown attached to the rock-shaft with connecting-rod J', which, by connection with a treadle, may be pressed upward to force the plunger into the mold, the same movement of the rock-shaft operating the other parts in conjunction therewith. Slots K are formed in the bed beneath the semimolds, and pins k are projected from the semimolds through the slots into the forked ends of mold-levers L, which are pivoted upon the under side of the bed and provided with a spring s to press them together, thus normally closing the mold. The rear ends of the levers extend backwardly beneath the rock-shaft E, and are provided with reversely-inclined seats l, which are engaged, when the treadle-lever is moved downward, by pins m, carried by the arm I. The lower end of the arm is formed with a cross-bar I' to sustain the pins at a suitable distance apart. The rotation of the pins toward the fulcra of the levers, as indicated by the arrow b in Fig. 1, operates, as shown in Fig. 10, to press the rear ends of the levers together, and to thus separate the pins k and the mold-sections, as shown in Fig. 4.

Slots l' are formed in the rear ends of the mold-levers L adjacent to the seats l to hold the pins m in contact with such seats; but such slots are not absolutely essential, as the spring s performs the same function. The joint operation of the arm I in retracting the mandrel d and opening the mold is indicated in Figs. 2 and 3, where the rear ends of the levers H and L are shown in proximity to one another and actuated the one by the middle of the cross-bar I' and the other by the pins m upon such cross-bar. The pins m are arranged to contact with the seats l, and slightly separate the mold-sections, before the cross-bar I' contacts with the toe h' to retract the mandrel, and the mold-sections are thus stripped from the compressed spool before the mandrel is withdrawn from the same.

The withdrawal of the mandrel, as shown in Fig. 2, would leave the spool standing isolated upon the centering-plug a, from which it is removed before the succeeding operation of the parts.

It will be observed that the semimolds are brought together chiefly by the spring s, (shown in Fig. 10,) which is wholly inadequate to support them in position during the pressing of the spool, and I therefore provide a clamp adapted to embrace the opposite sides of the semimolds and hold them firmly during the pressing operation. Such clamp is shown herein with two jaws c, hinged upon opposite sides of the bearing C' and provided each with arm c', extended to opposite sides of the rack-bar G. Pins e are projected from the rack-bar, one of each into a vertical slot e' in each of the arms c', and a slot f is formed transversely to the slot e' at the top of the same. Lateral slots g are formed in the standard at the sides of the rack-bar to permit the protrusion of the pins e into the slots e'. The plunger stands elevated above the mold when inserting the blank of material, as shown in Fig. 2, and its downward movement, with that of the rack-bar, carries the arm I away from the outer ends of the mandrel-lever H and mold-levers L before the plunger is pressed upon the material. The pins e are so arranged as to move the clamping-jaws, during this interval, to the outer sides of the semimolds, as shown in Fig. 1, the continued movement of the rack-bar then pressing the plunger upon the material.

To sustain the clamping-jaws in gripping the semimolds together, each jaw is provided with a brace i, which, as the jaw is moved to the outer side of the mold, slides along the inner face of a rib j, which is fixed at the end of the bed and resists any outward thrust upon the jaw during the compressing of the material. The inner face of the jaw is preferably inclined a little, as shown in Fig. 4, so that the brace may wedge against the same and crowd the clamp into tight contact with the mold. At the close of the compressing operation (shown in Fig. 1) the arm I is at a considerable distance from the mold-levers H, and the latter therefore remains stationary while the rack-bar is moved upward by the segment F, which movement retracts the jaws c from the mold before the levers are operated to separate the semimolds.

The blanks b may be inserted in the mold by hand, or by automatic feeding mechanism, and the machine may be operated by power if suitable means be provided to reciprocate the rod J', which oscillates the rock-shaft E.

It will be observed from the above description that all the movements of the machine after the blanks are inserted are automatic, as the mechanism which connects the semimolds, the clamp-jaws, the mandrel, and the plunger operates, first, to bring the semimolds into contact and to advance the mandrel within the mold; second, to lock or clamp the semimolds together; third, to force the plunger within the mold to compress the material; fourth, to withdraw the clamps and retract the plunger; fifth, to separate the semimolds from the spool upon the mandrel, and, finally, to retract the mandrel from the spool.

It will be observed that the mandrel-lever H is provided at its rear end with a spring $h^2$, adapted to hold the mandrel normally elevated; but such spring would not be adapted to resist the thrust which is caused during the pressing operation, by the compression of the material, and notches $d^2$ are therefore formed in the sides of the mandrel-head d', and keys L' are attached to the jaws L to enter such notches when the mandrel is elevated, as shown in Fig. 9. The mandrel is thus held positively within the mold during the compressing of the material, and serves to form the bore of the spool which fits it for use in the spooling-machine.

A notch H' is formed in the rear end of the lever H by providing a toe $h^3$ upon the outer side of the toe h', and the arm I engages such outer toe during its reverse movement, as indicated by the arrow $b'$ in Fig. 2, and thus positively forces the mandrel within the mold. The notch and the toe $h^3$ are not, however, essential, as the springs $h^2$ perform substantially the same function. It will be observed that the mandrel-lever in Fig. 3 is shown broken away adjacent to the bearing E', so as to fully expose the arm I and its connections with the cross-bar I' and pins $m$.

Having thus set forth the nature of our invention, what we claim herein is—

1. A machine for automatically molding spools when supplied with suitable material, comprising a longitudinally-divided mold, guides supporting the semimolds movably upon a bed, a movable clamp for locking the semimolds together when closed, a mandrel movable longitudinally within the mold, a plunger for compressing the material within the mold, and mechanism connecting the said parts and operated first to bring the semimolds into contact and to advance the mandrel within the mold, second, to lock the semimolds together, third, to force the plunger within the mold to compress the material, fourth, to retract the plunger, fifth, to separate the semimolds from the spool upon the mandrel, and finally to retract the mandrel from the spool, substantially as herein set forth.

2. A spool-molding machine comprising a suitable bed, a longitudinally-divided mold with guides upon the bed for the semimolds, a mandrel projected through the bed within the mold when closed, a standard carrying a plunger movably over the mold, clamping-jaws movable to and from the sides of the semimold when closed, and a rock-shaft with suitable connections to the mold parts, the mandrel, the clamping-jaws and the plunger, to operate them successively, as and for the purpose set forth.

3. In a spool-molding machine, the combination, with the bed A provided with the parallel guides B' and intermediate slots K, of the semimolds B fitted to such guides with the pins $k$ projected through the slots, the standard C carrying the rock-shaft E and movable plunger D with suitable connections from the rock-shaft to reciprocate the plunger, the levers L pivoted beneath the bed with their forward ends embracing the pins $k$ and provided with a spring $s$ to normally close the mold, and formed at their rear ends with the reversely-inclined seats $l$, and the arm upon the rock-shaft carrying the prongs $m$ adapted when pressed upon the seats of the levers to open the mold, the whole arranged and operated substantially as herein set forth.

4. In a spool-molding machine, the combination, with the bed A provided with the parallel guides B', of the semimolds B fitted to such guides, the standard with rock-shaft pivoted thereon and suitable connections with the rock-shaft to move the semimolds in the guides, the plunger reciprocated by connection to the rock-shaft, the mandrel $d$ inserted through the bed into the mold, the mandrel-lever H connected at its forward end with the mandrel and provided at its rear end with the toe $h'$ and normally depressed by spring $h^2$, and the arm carried by the rock-shaft to press upon said toe to retract the mandrel, the whole arranged and operated substantially as herein set forth.

5. In a spool-molding machine, the combination, with a bed A having the standard C carrying the rock-shaft E and provided at its opposite sides with the ribs $j$, of the semimolds movable upon the bed to and from such ribs, the rack-bar G movable vertically upon the standard with the segment F to reciprocate the same, the plunger fitted movably to the standard and connected with the rack-bar by head G', the clamping-jaws $c$ having braces $i$ thereon, and pivoted upon the opposite sides of the standard and provided with the slots $e'$, $f$ and fitted between the semimolds and the ribs, as set forth, and pins upon the rack-bar adapted to enter the slots and to retract the jaws from the sides of the mold when the plunger is raised, as and for the purpose set forth.

6. In a spool-molding machine, the combination, with the bed A provided with the parallel guides B' and the centering-plug $a$ intermediate to the same, with mandrel $d$ movable through such plug, of a plunger movable centrally over such plug and mandrel, semimolds movable in the guides, means for holding the semimolds in contact with the plug and advancing the mandrel within the mold, and means for forcing the plunger into the mold to compress the material, substantially as herein set forth.

7. In a spool-molding machine, the combination, with the bed A provided with the parallel guides B' and the centering-plug $a$ intermediate to the same, with mandrel $d$ movable through such plug, of a plunger movable centrally over such plug and mandrel, the clamping-jaws $c$ having braces $i$ thereon, and pivoted upon the opposite sides of the standard, semimolds movable in the guides, and suitable connections to first move the semimolds in contact with the plug and advance the mandrel within the mold, second, to move the jaws $c$ to the outer sides of the semimolds, third, to force the plunger within the mold to compress the material, fourth, to retract the plunger and separate the semimolds from the spool upon the mandrel, and finally to withdraw the mandrel from the spool leaving it supported by the plug, substantially as shown and described.

In testimony whereof we have hereunto set our hands in the presence of two subscribing witnesses.

HENRY M. WILSON.
HENRY CLEMENTSON.

Witnesses:
L. LEE,
THOMAS S. CRANE.